US011115312B1

(12) United States Patent
Hankins et al.

(10) Patent No.: US 11,115,312 B1
(45) Date of Patent: Sep. 7, 2021

(54) FILE CONTROL FOR DATA PACKET ROUTERS USING CONSENSUS AND INTER-PLANETARY FILE SYSTEM (IPFS)

(71) Applicant: T-MOBILE INNOVATIONS LLC, Overland Park, KS (US)

(72) Inventors: Clifton Wayne Hankins, Hoover, AL (US); Mary Carol Perry, Gulf Breeze, FL (US); Scott Paul Sherman, Roswell, GA (US); Rogelio Jay Barba, Jr., Las Vegas, NV (US)

(73) Assignee: Sprint Communications Company L.P., Overland Park, KS (US)

(*) Notice: Subject to any disclaimer, the term of this patent is extended or adjusted under 35 U.S.C. 154(b) by 56 days.

(21) Appl. No.: 16/703,752

(22) Filed: Dec. 4, 2019

(51) Int. Cl.
| | |
|---|---|
| H04L 12/751 | (2013.01) |
| H04L 29/08 | (2006.01) |
| G06F 16/182 | (2019.01) |
| H04L 12/733 | (2013.01) |
| H04L 12/741 | (2013.01) |

(52) U.S. Cl.
CPC .......... *H04L 45/02* (2013.01); *G06F 16/1837* (2019.01); *H04L 45/122* (2013.01); *H04L 45/745* (2013.01); *H04L 67/06* (2013.01)

(58) Field of Classification Search
None
See application file for complete search history.

(56) References Cited

U.S. PATENT DOCUMENTS

| | | | |
|---|---|---|---|
| 6,854,072 B1 | 2/2005 | Cagle et al. | |
| 8,578,054 B2 | 11/2013 | Thubert et al. | |
| 9,031,074 B2 | 5/2015 | Lee et al. | |
| 10,129,097 B2 | 11/2018 | Beecham et al. | |
| 10,158,555 B2 | 12/2018 | Ghosh et al. | |
| 10,362,517 B2 | 7/2019 | Crawford | |
| 2002/0062388 A1 | 5/2002 | Ogier et al. | |
| 2016/0234112 A1* | 8/2016 | Anand | H04L 45/64 |
| 2016/0261495 A1* | 9/2016 | Xia | H04L 45/12 |
| 2019/0149429 A1 | 5/2019 | Stocker | |
| 2019/0158469 A1 | 5/2019 | Gonzalez | |
| 2019/0327180 A1* | 10/2019 | Todd | H04L 41/042 |
| 2020/0019626 A1* | 1/2020 | Todd | H04L 9/0872 |
| 2020/0034548 A1* | 1/2020 | Wu | H04L 63/20 |
| 2020/0036772 A1* | 1/2020 | Xie | H04L 67/06 |
| 2020/0233760 A1* | 7/2020 | Wu | G06F 11/2023 |
| 2020/0394183 A1* | 12/2020 | Jois | G06F 21/64 |

\* cited by examiner

*Primary Examiner* — Ajit Patel

(57) ABSTRACT

A data packet router uses Inter-Planetary File System (IPFS) and consensus to control file modifications. The router routes data packets based on a networking file. The router modifies the networking file. The router generates a new IPFS object from the modified networking file. The router obtains consensus on the new IPFS object from neighbor routers. The routers use previously approved IPFS objects to retrieve topology data and achieve consensus on the modified networking file based on the topology data. In response to the consensus, the router routes data packets based on the modified networking file.

20 Claims, 8 Drawing Sheets

FILE CONTROL FOR DATA PACKET ROUTERS USING CONSENSUS AND INTER-PLANETARY FILE SYSTEM (IPFS)

TECHNICAL BACKGROUND

Data communication networks exchange data packets to support various data services like user messaging and machine control. The data packets have blocks of user data and headers with network addressing. The data communication networks route the data packets based on the network addresses in the packet headers. The network elements that transfer the packets are called packet routers. A common packet protocol is Internet Protocol (IP). The typical data communication network has multiple IP routers that route IP packets.

The IP routers use routing protocols to process the IP addresses from the packet headers of received IP packets to select output transmitter ports. A popular routing protocol is Open Shortest Path First (OSPF). OSPF is a link-state protocol. OSPF routers use a network topology to calculate the "shortest" paths from themselves to other OSPF routers. The shortest paths may be determined in various ways, but the fastest data path is usually the shortest path.

Another routing protocol is the distance vector protocol. Distance vector routers determine the hop-counts of the paths between themselves and other routers. Distance vector routers share their hop-count distances with their neighbor distance vector routers. Thus, a distance vector router typically selects a path to a neighbor router that has the lowest hop-count to the ultimate destination. The distance vector routers do not maintain formal network topologies, but they do maintain local topologies that indicate their neighbor routers.

Inter-Planetary File System (IPFS) is a peer-to-peer network protocol that uses content-addressing to control the exchange of data files. IPFS nodes hash their hosted data files into hash strings called IPFS objects. Unique data files hash to unique IPFS objects, and duplicate data files hash to the same IPFS object. The IPFS nodes exchange IPFS object requests, and the hosting IPFS nodes transfer their source data files for the requested IPFS objects to the requesting IPFS nodes. The IPFS nodes include translation functions between different routing protocols that allow the different protocols to exchange routing data.

Computer consensus is a decision-making technology that is often employed in distributed computer systems. In a distributed computer system, an initiating computing node executes a data-processing request like a balance transfer to generate a data-processing result like a new account balance. The computing node then requests consensus from other computing nodes in the distributed computer system. The other computing nodes also execute the data-processing request to generate the data-processing result. The computing nodes may apply a rule set to validate the data-processing result. The computing nodes may compare and match their results to validate the data-processing result. The computing nodes indicate their validations to the initiating node, and the initiating node aggregates the validations to obtain consensus. The initiating computer node and the other computing nodes then use the data-processing result responsive to the consensus. For example, the computing nodes may use a new account balance after consensus is reached on a balance transfer.

Unfortunately, data packet routers do not use IPFS and consensus to efficiently and effectively approve routing and topology file modifications.

TECHNICAL BACKGROUND

A data packet router uses Inter-Planetary File System (IPFS) and consensus to control file modifications. The router routes data packets based on a networking file. The router modifies the networking file. The router generates a new IPFS object from the modified networking file. The router obtains consensus on the new IPFS object from neighbor routers. In response to the consensus, the router approves the modified networking file. The router then routes data packets based on the modified networking file.

DETAILED DESCRIPTION

Figure 1:
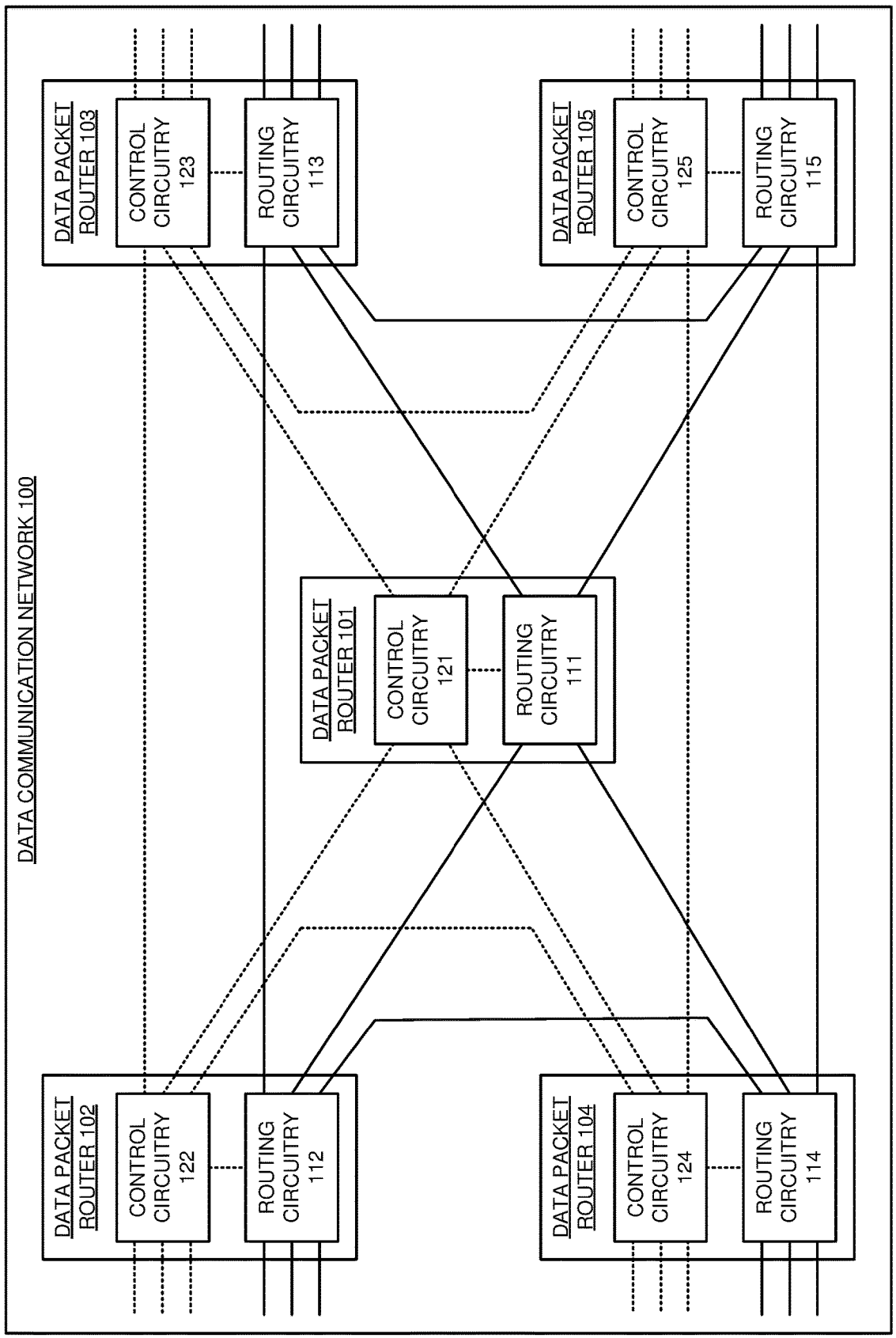
FIG. 1 illustrates a data communication network comprising data packet routers that use Inter-Planetary File System (IPFS) and consensus to approve their networking file modifications.

FIG. 1 illustrates data communication network 100 comprising data packet routers 101-105 that use Inter-Planetary File System (IPFS) and consensus to approve their networking file modifications. The networking files comprise routing data like translations between Internet Protocol (IP) addresses and physical transmitter ports. The networking files also comprise topology data like routers and their interconnections. The networking files include data tables that that store known routes to internal and external networks. Common data found in these tables are network addresses, distance metrics to the networks, and next-hop addresses for the networks. Data packet routers 101-105 comprise routing circuitries 111-115 and control circuitries 121-125. Routing circuitry 111 is linked to routing circuities 112-115. Control circuitry 121 is linked to control circuities circuitries 122-125. On FIG. 1, data links are solid lines and control links are dotted lines. Data packet routers 103-104 are coupled to router 102 and router 105 in a like manner.

In some examples, data packet routers 101-105 are part of a wireless communication network and comprise Cell-Site Routers (CSRs), User-Plane Functions (UPFs), Service Architecture Evolution Gateways (SAE GWs), Software-Defined Network (SDN) data-plane machines, or some other packet-handling network elements. In data packet routers 101-105, circuitries 111-115 and 121-125 comprise microprocessors, memory, software, and transceivers that are coupled over bus circuitry. The microprocessors comprise Central Processing Units (CPUs), Graphical Processing Units (GPUs), Application-Specific Integrated Circuits (ASICs), Digital Signal Processors (DSPs), and/or the like. The memories comprise Random Access Memory (RAM), flash circuitry, disk drives, and/or the like. The memories store software like operating systems and network applications. The network applications include routing engines and controllers. The data links between the routers may use Institute of Electrical and Electronic Engineers (IEEE) 802.3 (Ethernet), Time Division Multiplex (TDM), Data Over Cable System Interface Specification (DOCSIS), Fifth Generation New Radio (5G NR), IEEE 802.11 (WIFI), or some other data communication protocol.

In data packet routers 101-105, routing circuitries 111-115 route data packets based networking files. Control circuitries 121-125 verify modifications to the networking files with network topology data. The networking files and the topology data comprise link-state data, distance-vector data, or some other routing/networking data. The networking files and the topology data may comprise Open Shortest Path First (OSPF) routing data and topology data. Eventually, routing circuitry 111 modifies a copy of its networking file and transfers the modified networking file to control circuitry 121 for approval.

Control circuitry 121 generates an IPFS object from the modified networking file. Control circuitry 121 obtains consensus on the new IPFS object from neighbor control circuitries 122-125. Control circuitry 121 stores IPFS objects for routers 101-105 from prior consensus sessions. To form the consensus, control circuitry 121 retrieves topology data from router circuitry 111 using its IPFS object. Control circuitry 121 retrieves topology data from routers 102-105 using their IPFS objects. Control circuitry 121 verifies the modified networking file based on the topology data. For example, control circuitry 122 may process new routes to verify that all involved routers and links currently exist in the topologies. After verifying the modified networking file, control circuitry 121 requests consensus from control circuitries 122-125.

Control circuitry 122 receives the consensus request for the new IPFS object for router 101. Control circuitry 122 also stores IPFS objects for routers 101-105 from prior consensus sessions. Control circuitry 122 retrieves topology data from router circuitry 112 using the corresponding IPFS object. Control circuitry 122 retrieves topology data from routers 101 and 103-105 using IPFS objects. Control circuitry 122 retrieves the modified networking file and topology data from router 101 using the new IPFS object and a stored IPFS object. Control circuitry 122 retrieves verifies the modified networking file based on the topology data. For example, the control circuitry 112 may process the translations and topology data to verify the accuracy of the physical transceiver ports. After verifying the modified networking file, control circuitry 122 transfers consensus approval for the new IPFS object to control circuitry 121. Control circuitries 123-125 also receive the consensus request, verify the modified file against the topologies, and transfer consensus approvals to control circuitry 121. Data packet router 101 approves consensus for file modifications by data packet routers 102-105 in a like manner.

After verifying the modified networking file and receiving the consensus approval from neighbor routers 102-105, control circuitry 121 transfers approval for the file modification to routing circuitry 111. In response to the file approval, routing circuitry 111 starts routing data packets based the modified networking file. Control circuitries 111-115 store the new IPFS object for subsequent consensus sessions.

Figure 2:
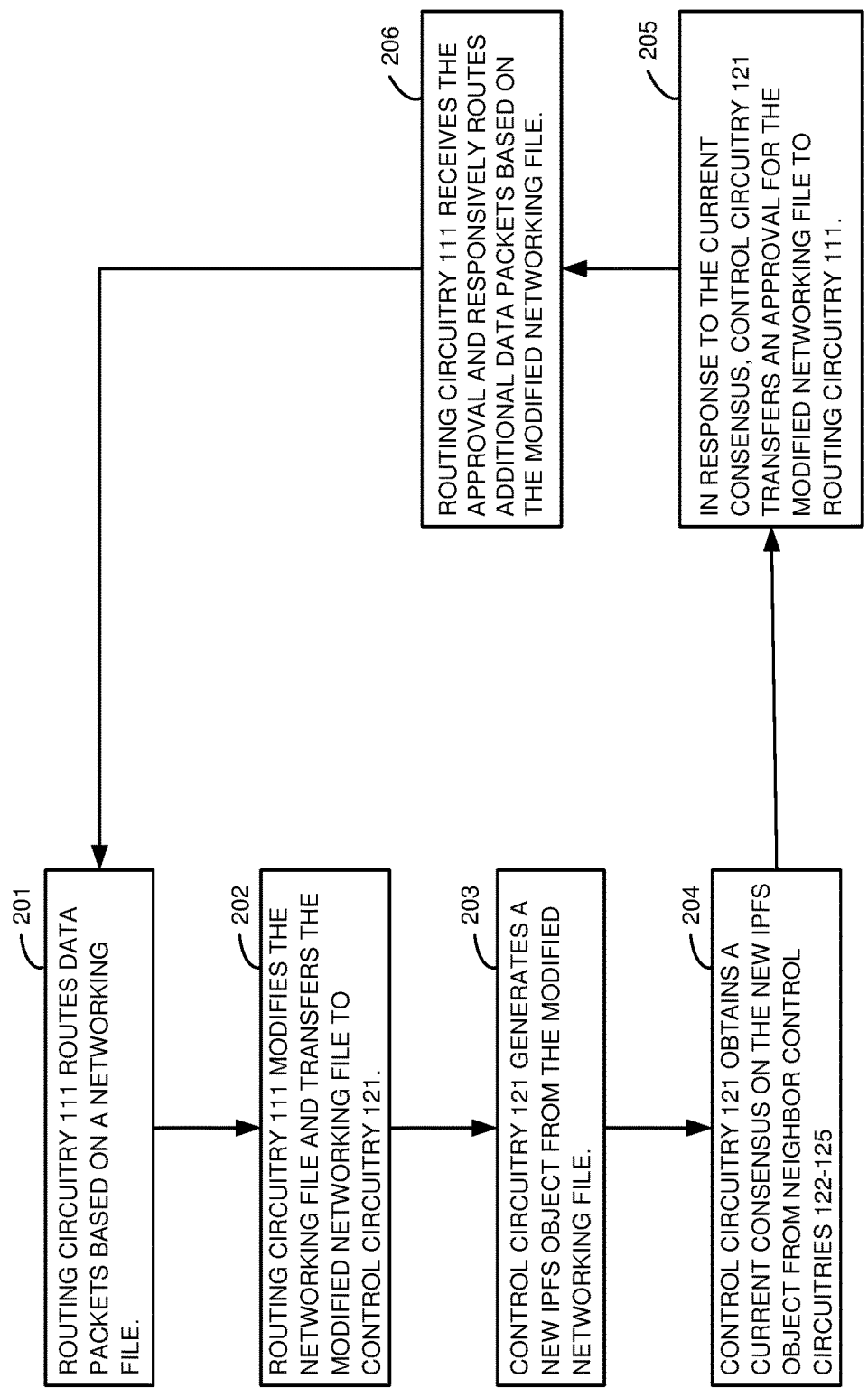
FIG. 2 illustrates the operation of the data packet routers to use IPFS and consensus to approve networking file modifications.

FIG. 2 illustrates the operation of data packet router 101 to use IPFS and consensus to approve networking file modifications. In data packet router 101, routing circuitry 111 routes data packets based a networking file (201). Routing circuitry 111 modifies its networking file and transfers the modified networking file to control circuitry 121 for approval (202). Control circuitry 121 generates an IPFS object from the modified networking file (203). Control circuitry 121 obtains a current consensus on the new IPFS object from neighbor control circuitries 122-125 (204). In response to the current consensus, control circuitry 121 transfers approval for the file modification to routing circuitry 111 (205). Routing circuitry 111 receives the approval and responsively routes data packets based the modified networking file (206). The operation repeats (201).

Figure 3:
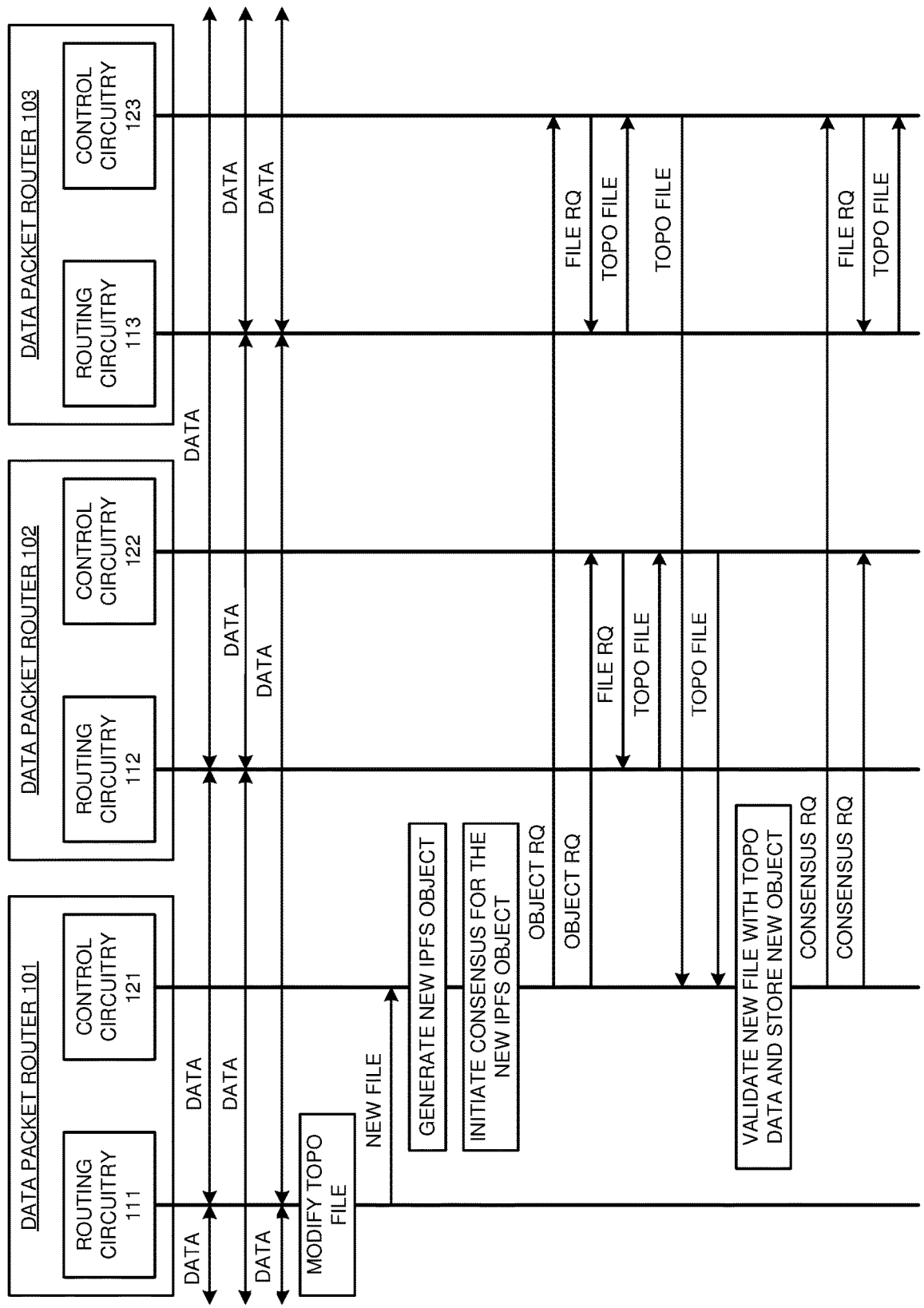
FIG. 3 illustrates the operation of the data packet routers to use IPFS and consensus to approve networking file modifications.
Figure 4:
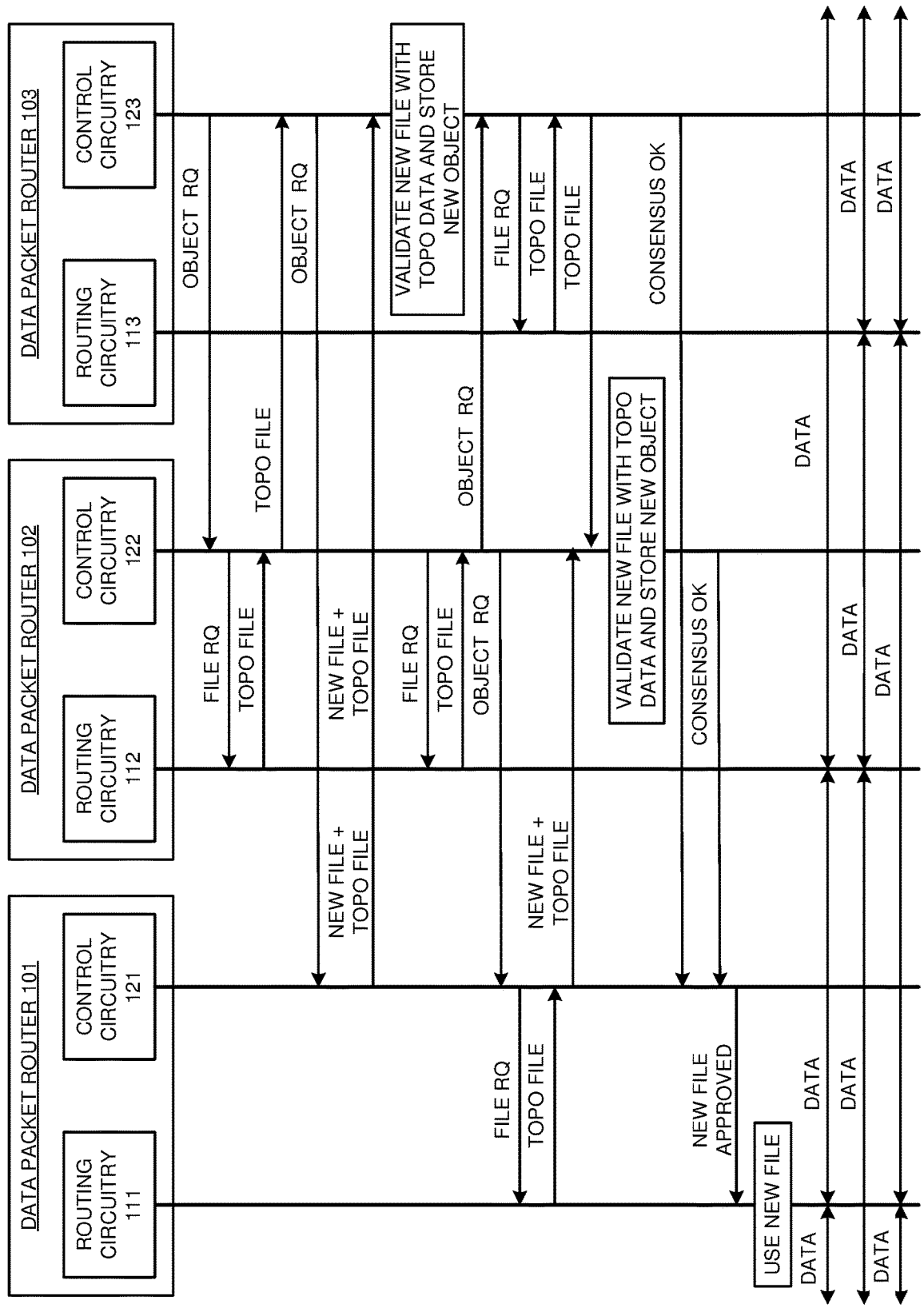
FIG. 4 illustrates the operation of the data packet routers to use IPFS and consensus to approve networking file modifications.

FIGS. 3-4 illustrate the operation of data packet routers 101-103 to use IPFS and consensus to approve networking file modifications. Referring to FIG. 3, routing circuitries 111-113 in routers 101-103 route data packets based their networking files. In this example, routing circuitry 111 modifies a copy of its topology file and transfers the modified topology file to control circuitry 121 for approval. Control circuitry 121 generates an IPFS object from the modified topology file. Control circuitry 121 initiates consensus for the new IPFS object and stores the IPFS object in association with the modified file.

Control circuitry 121 transfers previously stored IPFS objects to control circuitries 122-123 to retrieve topology data from data packet routers 102-103. Control circuitries 122-123 transfer corresponding file requests for the requested topology files. Routing circuitries 112-113 transfer their topology files to control circuitries 122-123, and control circuitries 122-123 transfer the topology files to control circuitry 121. Control circuitry 121 verifies the modified topology file based on the retrieved topology files from neighbor routers 102-103. For example, control circuitry 121 may verify consistency among the static portion of the topologies and apply a rule set to approve the modified portions of the topology. The rule set might have addressing restrictions for some routers but not other routers.

After verifying the modified topology file, control circuitry 121 requests consensus from control circuitries 122-123. Control circuitry 123 receives the consensus request for the new IPFS object. Control circuitry 123 transfers a corresponding file request for the requested topology file, and routing circuitry 113 transfers its current topology file to control circuitry 123.

Referring to FIG. 4, control circuitry 123 transfers an IPFS object request to control circuitry 122 to retrieve topology data from data packet router 102. Control circuitry 122 transfers a corresponding file request for the requested topology file, and routing circuitry 112 transfers its topology file to control circuitry 122. Control circuitry 122 transfers the requested topology file to control circuitry 123. Control circuitry 123 transfers requests for the new IPFS object and a stored IPFS object to control circuitry 121. Control circuitry 121 retrieves the modified file. Control circuitry 121 transfers a corresponding file request for the requested topology file, and routing circuitry 111 transfers its current topology file to control circuitry 121. Control circuitry 121 transfers the modified topology file and the stored topology file to control circuitry 123. Control circuitry 123 verifies the modified topology file for router 101 based on the retrieved topology files from neighbor routers 101-102. In this example, the verification entails matching the unchanged parts of the topologies, ensuring the change is consistent across topologies, and applying a simple rule set for new routers, connections, and addresses.

To serve consensus, control circuitry 122 transfers a file request for its topology file, and routing circuitry 112 transfers the topology file to control circuitry 122. Control circuitry 122 transfers an IPFS object request to control circuitry 123 for topology data from data packet router 103. Control circuitry 123 transfers the object request to routing circuitry 113, and routing circuitry 113 return the topology file to control circuitry 123. Control circuitry 123 transfers the topology file to control circuitry 122. Control circuitry 122 transfers requests for the new IPFS object and a stored IPFS object to control circuitry 121. Control circuitry 121 retrieves the modified file. Control circuitry 121 transfers a corresponding file request for the requested topology file, and routing circuitry 111 transfers the topology file to control circuitry 121. Control circuitry 121 transfers the modified topology file and the stored topology file to control circuitry 122. Control circuitry 122 verifies the modified topology file for router 101 based on the retrieved topology files from neighbor routers 101-102. In this example, the verification entails matching the unchanged parts of the topologies, ensuring the change is consistent across topologies, and applying a simple rule set for new routers, connections, and addresses.

Control circuitries 122-123 transfer their consensus approvals to control circuitry 121. After verifying the modified topology file and receiving the consensus approvals from neighbor routers 102-103, control circuitry 121 transfers approval for the file modification to routing circuitry 111. In response to the file approval, routing circuitry 111 in data packet router 101 routes data packets based the modified networking file. In data packet routers 102-103, routing circuitries 112-113 route data packets based their existing networking files.

Advantageously, data packet routers 101-105 efficiently and effectively use IPFS and consensus to approve routing and topology file modifications in a controlled manner.

Figure 5:
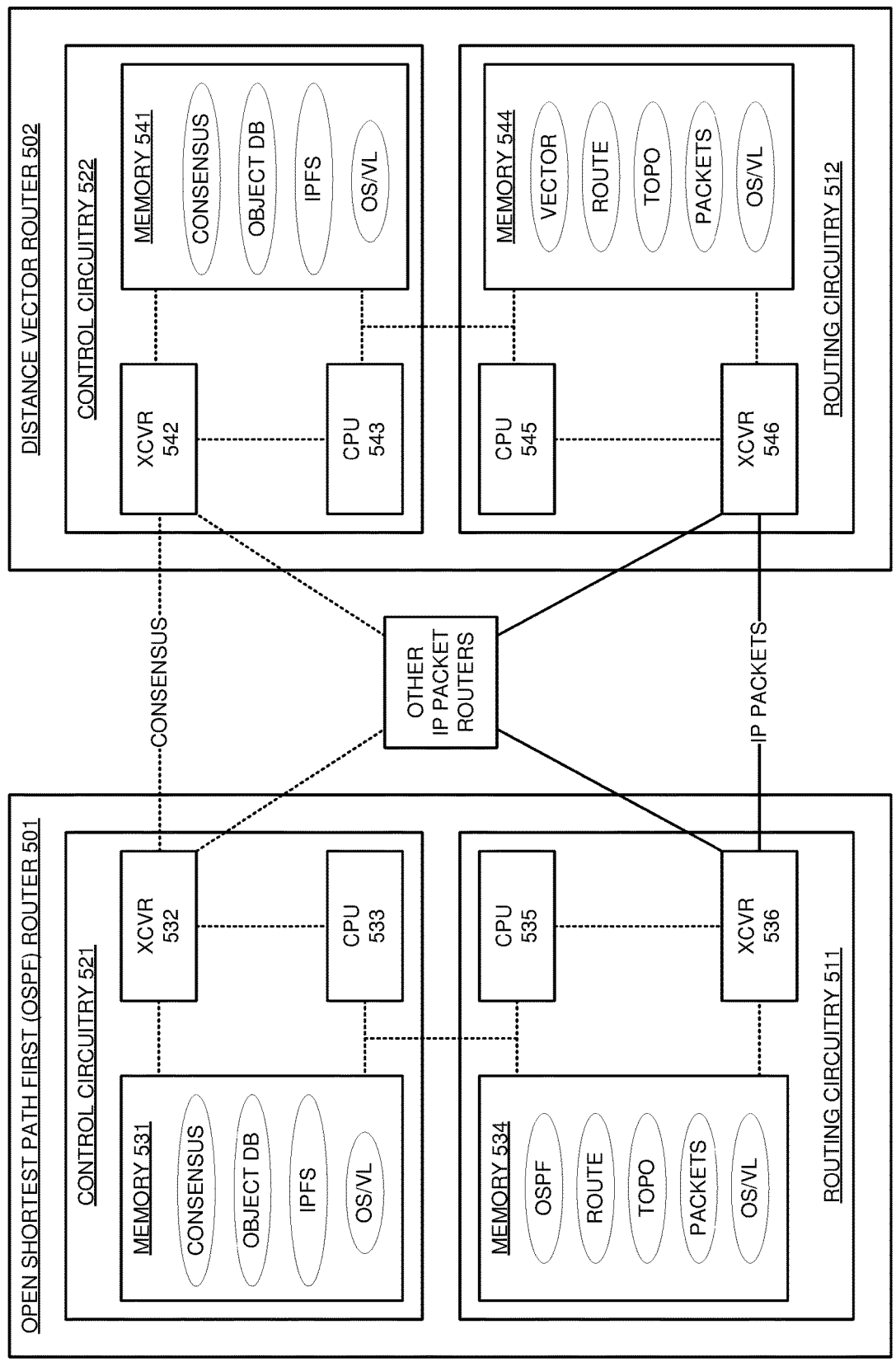
FIG. 5 illustrates an Open Shortest Path First (OSPF) router and a distance vector router that use IPFS and consensus to approve their networking file modifications which comprise routing file modifications and topology file modifications.

FIG. 5 illustrates Open Shortest Path First (OSPF) router 501 and distance vector router 502 that use IPFS and consensus to approve their routing file modifications and their topology file modifications. OSPF router 501 and distance vector router 502 are examples of data packet routers 101-105, although routers 101-105 may differ. OSPF router 501 comprises routing circuitry 511 and control circuitry 521 which are coupled over bus circuitry or some other communication links. Distance Vector router 502 comprises routing circuitry 512 and control circuitry 522 which are coupled over bus circuitry or some other communication links. Control circuitry 522 comprises memory 541, transceiver 542, and CPU 543 which are coupled over bus circuitry. Routing circuitry 512 comprises memory 544, CPU 545, and transceiver 546 which are coupled over bus circuitry.

In OSPF router 501, memory 531 stores an operating system (OS), virtual layer (VL), IPFS application, object database (DB), and consensus application. Memory 534 stores an operating system, virtual layer, OSPF application, routing file, topo file, and Internet Protocol (IP) packets. In distance vector router 502, memory 541 stores an operating system, virtual layer, IPFS application, object database, and consensus application. Memory 544 stores an operating system, virtual layer, distance vector application, routing data, topo data, and IP packets.

In routing circuitry 511, CPU 535 executes the operating system, virtual layers, OSPF application, and routing data to exchange the IP packets over transceiver 536 with distance vector router 502 and typically other IP packet routers. Over time, the OSPF application determines modifications to its routing file or topo file. In control circuitry 521, CPU 533 executes the operating system, virtual layers, IPFS application, and consensus application to exchange control signaling over transceiver 532 with control circuitry 522 and other IP packet routers. The control signaling includes consensus data and IPFS objects. The consensus application performs consensus operations for routing and topo file modifications that are made by distance vector router 502 and the other IP packet routers.

In routing circuitry 512, CPU 545 executes the operating system, virtual layers, distance vector application, and routing data to exchange IP packets over transceiver 546 with OSPF router 501 and other IP packet routers. Over time, the distance vector application determines modifications to its routing file or topo file. In control circuitry 522, CPU 543 executes the operating system, virtual layers, IPFS application, and consensus application to exchange control signaling over transceiver 542 with control circuitry 521 and the other IP packet routers. The control signaling includes consensus data and IPFS objects. The consensus application performs consensus operations for routing and topo file modifications that are made by OSPF router 501 and the other IP packet routers.

Figure 6:
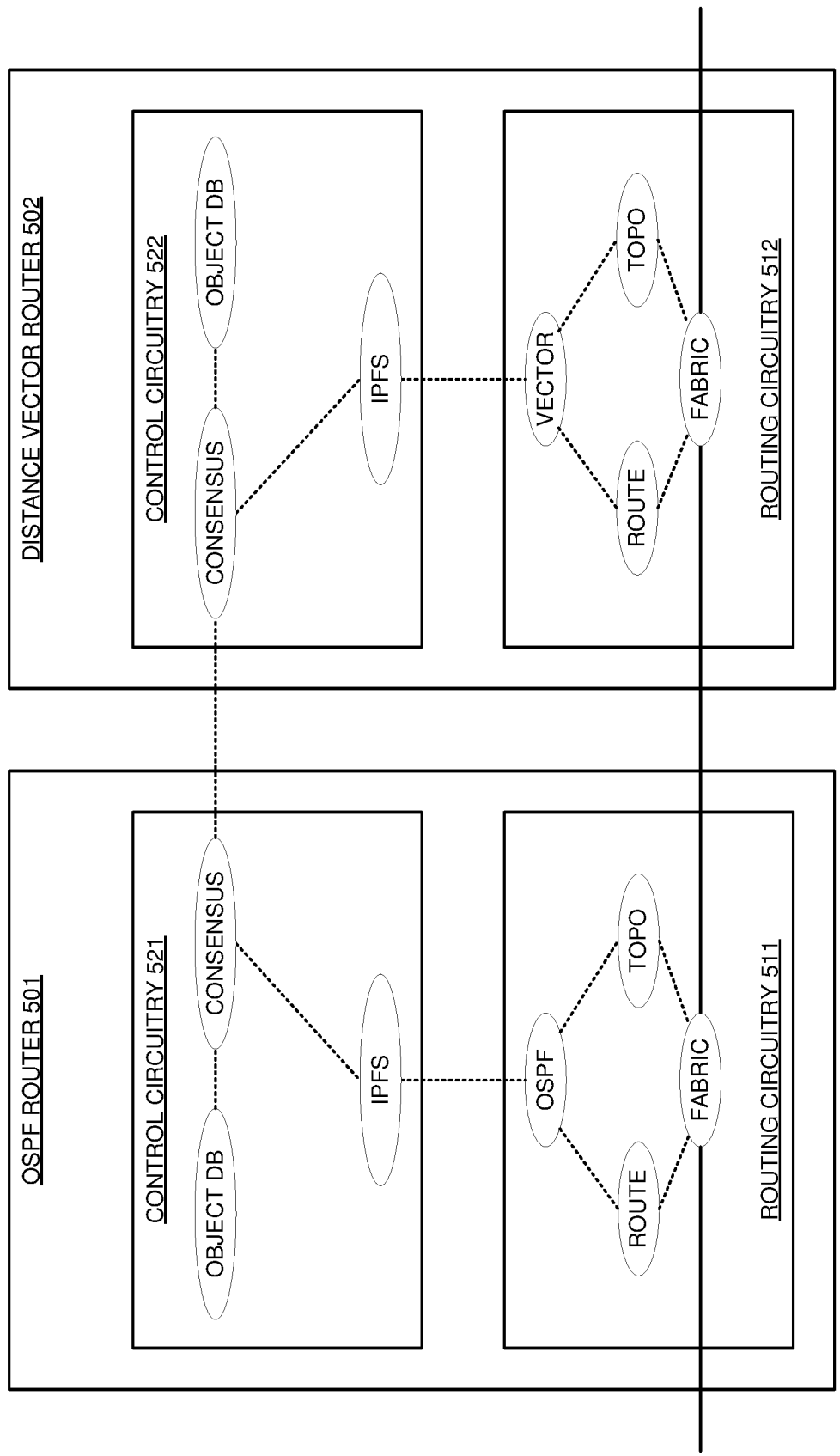
FIG. 6 illustrates the operation of the OSPF router and the distance vector router to use IPFS and consensus to approve their routing file modifications and topology file modifications.

FIG. 6 illustrates the operation of OSPF router 501 and distance vector router 502 to use IPFS and consensus to approve their routing file modifications and their topology file modifications. In OSPF router 501, the routing fabric routes IP packets based on the routing file and the topo file. The OSPF application controls the routing and topo files which control the IP packet routing in the fabric. When the OSPF application determines a modification to the routing file or the topo file, the OSPF application first submits the modified file to the IPFS application in control circuitry 521 for approval.

In control circuitry 521, the IPFS application receives the new routing/topo file from the OSPF application and generates a new IPFS object from the new file. The IPFS application transfers the new IPFS object to the consensus application for approval. The consensus application retrieves previously-stored IPFS objects for neighbor topo files from the object data base. The consensus application requests the IPFS objects for the modified file and the topo file from the IPFS object. The IPFS object retrieves the corresponding topo file from routing circuitry 511 and transfers the modified file and the topo file to the consensus application. The consensus application also requests IPFS objects for topo files from distance vector router 502 and typically the other IP packet routers.

In distance vector router 502, the consensus application receives the IPFS object request and transfers the request to the IPFS object in circuitry 522. The IPFS application retrieves the corresponding topo file from routing circuitry 512 (and distance vector topo data is typically limited to neighbor information only). The IPFS application transfers the corresponding topo file to the consensus application which forwards the topo file to the consensus application in control circuitry 521. The consensus application in OSPF router 501 validates the new routing/topo file against the topo files from routers 501-502 and usually other routers. For example, the consensus application may verify that the existing routers and links that are identified in the routing data are accurately represented in all of the topologies and that the modification passes a simple rule set. After verifying the modified file, the consensus application in control circuitry 521 requests consensus from the consensus applications in distance vector router 502 and possibly some of the other IP routers.

The consensus application in control circuitry 522 receives the consensus request for the new IPFS object for OSPF router 501. The consensus application in control circuitry 522 retrieves IPFS objects for OSPF router 501 and possibly other IP routers from the object database to verify the modified routing/topo file. The consensus application in router 502 requests the IPFS objects for the modified routing/topo file and the topo file from the consensus application in OSPF router 501. In router 501, the consensus application requests the IPFS objects from the IPFS application. The IPFS object retrieves the corresponding topo file from routing circuitry 511. The IPFS object transfers the corresponding topo file and modified routing/topo file to the consensus application. The consensus application transfers the modified routing/topo file and the stored topo file to the consensus application in distance vector router 502.

In distance vector router 502, the consensus application validates the new routing/topo file against the topo files from routers 501-502 and possibly other routers. For example, the consensus application may verify that the routers and links in the routing data are accurately represented in the topologies. After verifying the modified file, the consensus application in control circuitry 522 transfers consensus approval to the consensus applications in OSPF router 501.

After verifying the modified networking file and receiving the consensus approval from distance vector router 502 and other IP routers, the consensus application in control circuitry 521 grants consensus and transfers approval for the new IPFS object to the IPFS application. The IPFS application responsively transfers an approval for the file modification to the OSPF application in routing circuitry 511. In response to the file approval, the OSPF application loads the modified routing file, and the fabric now uses the modified routing/topo file to route IP packets. The consensus applications store the new IPFS object in their object databases for use in subsequent consensus operations.

In distance vector router 502, the routing fabric routes IP packets based on the routing file and possibly the topo file. The distance vector application controls the routing and topo file which control IP packet routing in the fabric. When the distance vector application determines a modification to the routing file or the topo file, the distance vector application first submits the modified file to the IPFS application in control circuitry 522.

In control circuitry 522, the IPFS application receives the new routing/topo file from the distance vector application and generates a new IPFS object from the new file. The IPFS application transfers the new IPFS object to the consensus application for approval. The consensus application retrieves IPFS objects for neighbor topo files from the object data base per the current topo file and prior consensus operations. The consensus application requests the IPFS object for the topo file in routing circuitry 512 from the IPFS application. The IPFS application retrieves the corresponding topo file from routing circuitry 512. The IPFS application transfers the corresponding topo file to the consensus application. The consensus application requests IPFS objects for the modified file and the topo file from OSPF router 501. The consensus application may request IPFS objects for topo files from the other IP packet routers.

In OSPF router 501, the consensus application receives the IPFS object request and transfers the request to the IPFS application. The IPFS application retrieves the corresponding topo file from routing circuitry 512. The IPFS object transfers the corresponding topo file to the consensus application. The consensus application in OSPF router 501 transfers the topo file to the consensus application in control circuitry 522. The consensus application in distance vector router 502 validates the new routing/topo file against the topo files from routers 501-502 and other routers. After verifying the modified file, the consensus application in control circuitry 522 requests consensus from the consensus applications in OSPF router 501 and some of the other IP routers.

The consensus application in control circuitry 521 receives the consensus request for the new IPFS object for distance vector router 502. The consensus application retrieves IPFS objects for distance vector router 502 and possibly other IP routers per the current topo file and prior consensus. The consensus application requests the IPFS objects for the modified routing file and the topo file from the consensus application in distance vector router 502. The consensus application requests the IPFS objects from the IPFS application. The IPFS object retrieves the corresponding topo file from routing circuitry 512. The IPFS object transfers the corresponding topo file and modified file to the consensus application. The consensus application transfers the modified file and the topo file to the consensus application in OSPF router 501.

In OSPF router 501, the consensus application validates the new file against the topo files from routers 501-502 and possibly other routers. After verifying the modified file, the consensus application in control circuitry 521 transfers consensus approval to the consensus application in distance vector router 502. After verifying the modified networking file and receiving the consensus approval from OSPF router 501 and the other IP routers, the consensus application in control circuitry 522 grants consensus and transfers approval for the new IPFS object to the IPFS application. The IPFS application in router 102 responsively transfers an approval for the file modification to the distance vector application in routing circuitry 512. In response to the file approval, the distance vector application loads the modified routing file, and the fabric now uses the modified routing/topo file to route IP packets. The consensus applications store the new IPFS object in their object databases for use in subsequent consensus operations.

Figure 7:
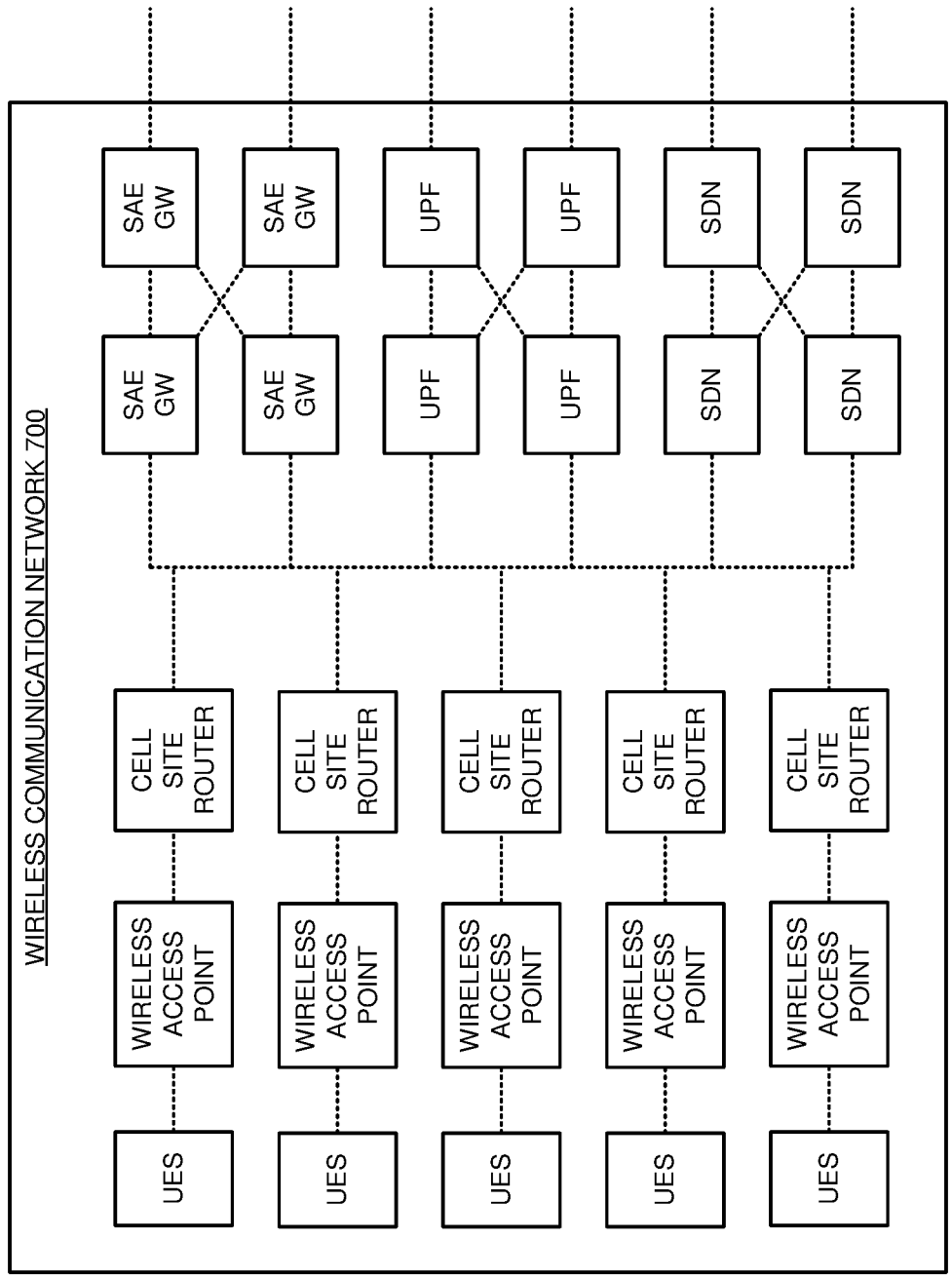
FIG. 7 illustrates a wireless communication network comprising cell-site routers, System Architecture Evolution Gateways (SAE GWs), User-Plane Functions (UPFs), and Software Defined Network (SDN) machines that use IPFS and consensus to approve their routing file modifications and topology file modifications.

FIG. 7 illustrates wireless communication network 700 comprising Cell-Site Routers (CSRs), System Architecture Evolution Gateways (SAE GWs), User-Plane Functions (UPFs), and Software Defined Network (SDN) machines that use IPFS and consensus to approve their routing file modifications and their topology file modifications. Wireless communication network 700 is an example of network 100 and routers 501-502, although network 100 and routers 501-502 may differ. User Equipment (UEs) are wirelessly linked to wireless access points over 5GNR, LTE, WIFI, LP-WAN, or some other wireless protocols. The UEs comprise computers, phones, robots, vehicles, or some other data appliances with wireless communication circuitry. Wireless communication network 700 delivers data services to the UEs like mobile internet-access, media-conferencing, machine communications, or some other wireless communication product. The wireless access points are linked to the cell site routers over wireless or wireline links. The cell site routers are linked to the SAE GWs, the UPFs, and the SDN machines. The cell site routers, SAE GWs, UPFs, and SDN machines implement packet routers like routers 101-105 and 501-502. Thus, the cell site routers, SAE GWs, UPFs, and SDN machines comprise IP routers that use IPFS and consensus to modify their routing and topo files in the controlled manner that is described herein.

In an exemplary operation, the cell site routers, SAE GWs, UPFs, and SDN machines, route IP packets based on routing data and topo data. One of cell site routers modifies a copy of its routing file and generates an IPFS object from the modified routing file. The cell site router initiates consensus for the new IPFS object. The cell site router transfers the new IPFS object to at least some of the other cell site routers, SAE GWs, UPFs, and SDN machines. The routers, GWs, UPFs, and SDN machines retrieve OSPF topo data from one another using previously approved OSPF objects. The routers, GWs, UPFs, and SDN machines retrieve the modified routing file using the new OSPF object. The routers, GWs, UPFs, and SDN machines verify the modified routing file based on their retrieved topo files. The routers detect inconsistencies between the routing file and the topo files. For example, a modified routing file may serve new IP addresses over an existing transmitter port per an address rule set for the port. In another example, a modified routing file may serve new IP addresses over an "existing" transmitter port, but the modified routing file is not approved because the "existing" transmitter port is missing from the other topo files. After verifying the modified routing file and receiving consensus approval from the routers, GWs UPFs, and SDN machines, the cell site router uses the modified routing file to route IP packets. The SAE GWs, UPFs, and SDN machines could modify their routing or topo files in a like manner.

Figure 8:
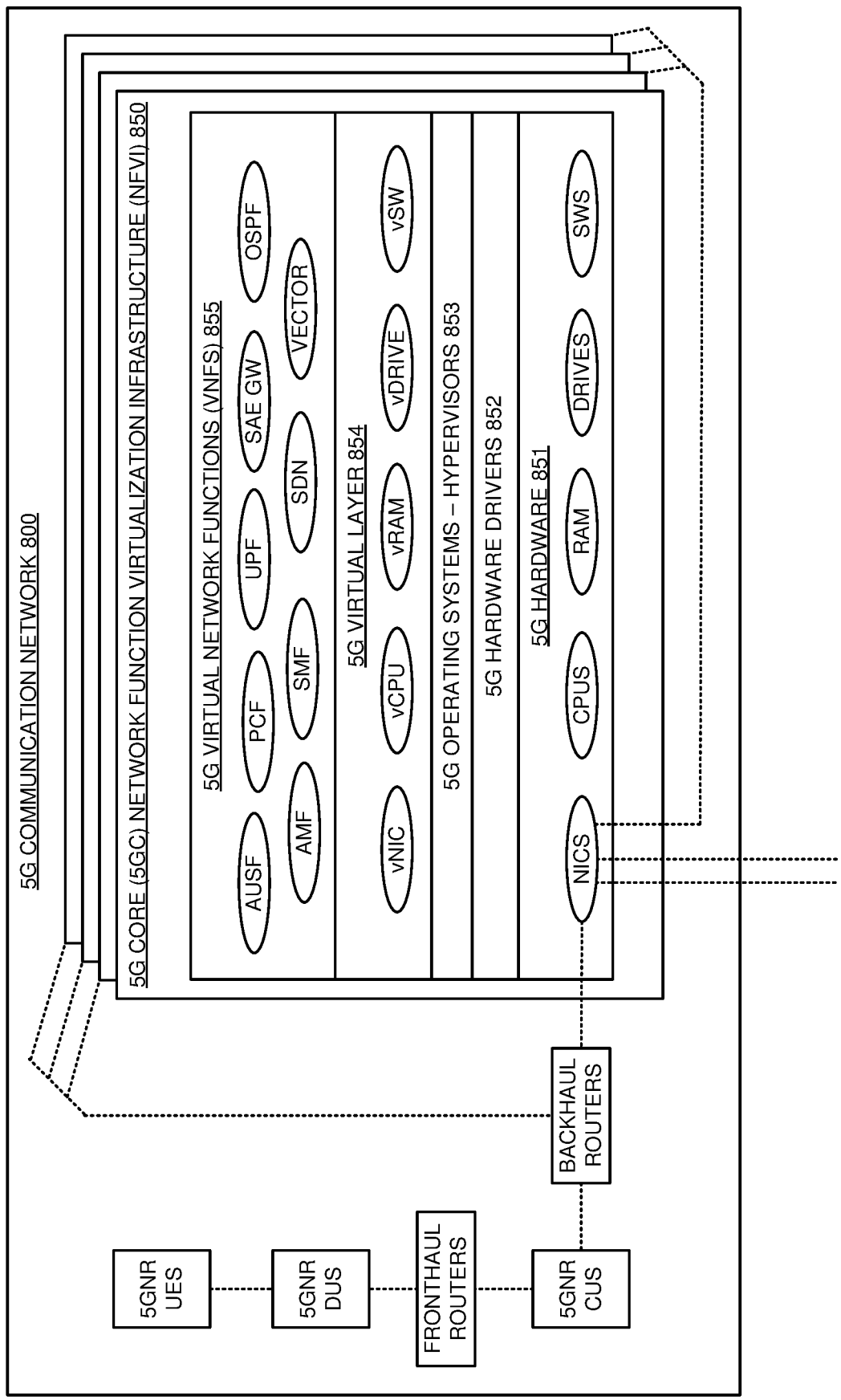
FIG. 8 illustrates a Fifth Generation (5G) communication network comprising backhaul routers, OSPF routers, distance vector routers, SAE GWs, UPFs, and SDN machines that use IPFS and consensus to approve their routing file modifications and topology file modifications.

FIG. 8 illustrates Fifth Generation (5G) communication network 800 comprising fronthaul routers, backhaul routers, OSPF routers, distance vector routers, SAE GWs, UPFs, and SDN machines that use IPFS and consensus to modify their routing and topology files. 5G communication system 800 is an example of data communication network 100, routers 501-502, and wireless communication network 700, although network 100, routers 501-502, and network 700 may differ. 5G communication system 800 comprises 5GNR UEs, 5GNR Distributed Units (DUs), fronthaul routers, 5GNR Central Units (CUs), backhaul routers, and multiple 5GC Network Function Virtualization Infrastructures (NFVIs). NFVI 850 is depicted in detail on FIG. 8 and the other NFVIs are similar. The 5GNR UEs and 5GNR DUs are coupled over wireless 5GNR links. The 5GNR DUs and the fronthaul routers are coupled over data links. The fronthaul routers and the 5GNR CUs are coupled over data links. The 5GNR CUs and the backhaul routers are coupled over data links. The backhaul routers and the NFVIs are coupled over data links. The NFVIs are coupled to one another over data links. In some examples, the 5GNR DUs and 5GNR CUs host the fronthaul routers, and the 5GNR CUs and 5GC NFVIs host the backhaul routers.

5GC NFVI 850 comprises 5G hardware 851, 5G hardware drivers 852, 5G operating systems and hypervisors 853, 5G virtual layer 854, and 5G Virtual Network Functions (VNFs) 855. 5G hardware 851 comprises Network Interface Cards (NICs), CPUs, RAM, flash/disk drives, and data switches (SWS). 5G virtual layer 854 comprises virtual NICs (vNIC), virtual CPUs (vCPU), virtual RAM (vRAM), virtual Drives (vDRIVE), and virtual Switches (vSW). The NICs of the NFVIs are coupled to each other and to external systems over data links. 5G VNFs 855 comprise Authentication and Security Functions (AUSF), Policy Control Functions (PCF), Access and Mobility Management Functions (AMF), Session Management Functions (SMF), User Plane Functions (UPF), SDN machine controllers (SDN), SAE GWs, OSPF routers, and distance vector routers. Other 5G network functions are typically present but are omitted for clarity. 5G hardware 851 executes 5G hardware drivers 852, 5G operating systems and hypervisors 853, 5G virtual layer 854, and 5G VNFs 855 to serve the 5GNR UEs with various data services. Exemplary services include mobile internet-access, media-conferencing, machine communications, and the like. The UEs comprise computers, phones, robots, vehicles, or some other wireless data appliances.

The fronthaul routers, backhaul routers, UPFs, SAE GWs, SDN machine controllers, OSPF router, and distance vector routers are configured like routers 101-105 and perhaps 501-502. These routers, GWs, UPFs, and SDN machines comprise IP routers that use IPFS and consensus to modify their routing and topo files in the controlled manner as described herein.

In an exemplary operation, the fronthaul routers, backhaul routers, and OSPF routers route IP packets based on OSPF routing data and topo data. One of backhaul routers modifies a copy of its topo file and generates an IPFS object from the modified topo file. The backhaul router initiates consensus for the new IPFS object. The backhaul router transfers the new IPFS object to the fronthaul routers, backhaul routers, and OSPF routers. The routers retrieve OSPF topo data from one another using previously approved OSPF objects. The routers retrieve the modified topo file using the new OSPF object. The fronthaul, backhaul, and OSPF routers verify the modified topo file based on their retrieved topo files. The routers detect inconsistencies among the various topo files. In an example, a modified topo file may add a connection between "existing" routers, but the modified topo file is not approved because one of the "existing" routers does not exist in the stored topo files. After verifying the modified topo file and receiving consensus approval from the fronthaul, backhaul, and OSPF routers, the backhaul router uses the modified topo file to route IP packets. The fronthaul, backhaul, and OSPF routers also use the approved IPFS object and corresponding topo file for subsequent consensus operations. The SAE GWs, UPFs, and SDN machines could modify their routing or topo files in a like manner.

The wireless data network circuitry described above comprises computer hardware and software that form special-purpose network circuitry to use IPFS and consensus to approve routing file modifications and topology file modifications. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to use IPFS and consensus to approve routing file modifications and topology file modifications.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a data packet router using an Inter-Planetary File System (IPFS), the method comprising:
   routing circuitry of the data packet router routing initial data packets based on an initial networking file;
   the routing circuitry modifying the initial networking file to modify at least one parameter impacting at least one route for routing data to generate a modified networking file and transferring the modified networking file to control circuitry of the data packet router;
   the control circuitry generating a new IPFS object from the modified networking file, obtaining a current consensus on the new IPFS object from neighbor control circuitries of neighbor data packet routers by verifying the modified networking file, transmitting a consensus request to each of the neighbor control circuitries, and receiving, in response to the consensus request, a consensus approval from each of the neighbor control circuitries indicating verification of the modified networking file, and responsive to the current consensus, transferring an approval for the modified networking file to the routing circuitry; and
   the routing circuitry receiving the approval and responsively routing additional data packets based on the modified networking file.

2. The method of claim 1 wherein the data packet router is in a wireless communication network and comprises one of a: Cell-Site Router (CSR), User-Plane Function (UPF), Service Architecture Evolution Gateway (SAE GW), and Software-Defined Network (SDN) data-plane machine.

3. The method of claim 1 further comprising the control circuitry forming prior consensus on neighbor networking files using neighbor IPFS objects and storing the neighbor IPFS objects.

4. The method of claim 3 wherein the control circuitry obtaining the current consensus on the new IPFS object comprises retrieving topology data using the stored neighbor IPFS objects and verifying the modified networking file based on the topology data.

5. The method of claim 4 wherein the modified networking file comprises link-state data and the topology data comprises distance-vector data.

6. The method of claim 4 wherein the modified networking file comprises distance-vector data and the topology data comprises link-state data.

7. The method of claim 4 wherein the topology data comprises Open Shortest Path First (OSPF) topology data.

8. The method of claim 4 wherein the modified networking file comprises Open Shortest Path First (OSPF) routing data.

9. The method of claim 4 wherein the modified networking file comprises Open Shortest Path First (OSPF) topology data.

10. The method of claim 4 wherein the neighbor control circuitries store their own neighbor IPFS objects, retrieve their own topology data using their own neighbor IPFS objects, retrieve the modified networking file using the new IPFS object, and verify the modified networking file based on their own topology data to form the current consensus.

11. A data packet router that uses an Inter-Planetary File System (IPFS), the data packet router comprising:
    routing circuitry configured to route initial data packets based on an initial networking file;
    the routing circuitry configured to modify the initial networking file to modify at least one parameter impacting at least one route for routing data to generate a modified networking file and transfer the modified networking file to control circuitry;
    the control circuitry, linked to neighbor control circuitries, and configured to generate a new IPFS object from the modified networking file, obtain a current consensus on the new IPFS object from the neighbor control circuitries of neighbor data packet routers by verifying the modified networking file, transmitting a consensus request to each of the neighbor control circuitries, and receiving in response to the consensus request, a consensus approval from each of the neighbor control circuitries indicating verification of the modified networking file, and responsive to the current consensus, transfer an approval for the modified networking file to the routing circuitry; and
    the routing circuitry configured to receive the approval and responsively route additional data packets based on the modified networking file.

12. The data packet router of claim 11 wherein the data packet router is in a wireless communication network and comprises one of a: Cell-Site Router (CSR), User-Plane Function (UPF), Service Architecture Evolution Gateway (SAE GW), and Software-Defined Network (SDN) data-plane machine.

13. The data packet router of claim 11 further comprising the control circuitry configured to form prior consensus on neighbor networking files using neighbor IPFS objects and store the neighbor IPFS objects.

14. The data packet router of claim 13 wherein the control circuitry is configured to retrieve topology data using the stored neighbor IPFS objects and verify the modified networking file based on the topology data.

15. The data packet router of claim 14 wherein the modified networking file comprises link-state data and the topology data comprises distance-vector data.

16. The data packet router of claim 14 wherein the modified networking file comprises distance-vector data and the topology data comprises link-state data.

17. The data packet router of claim 14 wherein the topology data comprises Open Shortest Path First (OSPF) topology data.

18. The data packet router of claim 14 wherein the modified networking file comprises Open Shortest Path First (OSPF) routing data.

19. The data packet router of claim 14 wherein the modified networking file comprises Open Shortest Path First (OSPF) topology data.

20. The data packet router of claim 14 wherein the neighbor control circuitries are configured to store their own neighbor IPFS objects, retrieve their own topology data using their own neighbor IPFS objects, retrieve the modified networking file using the new IPFS object, and verify the modified networking file based on their own topology data to form the current consensus.

* * * * *